Sept. 13, 1966  J. A. RAKEL  3,272,114
HEAT SEALING APPARATUS
Filed May 15, 1964  5 Sheets-Sheet 1
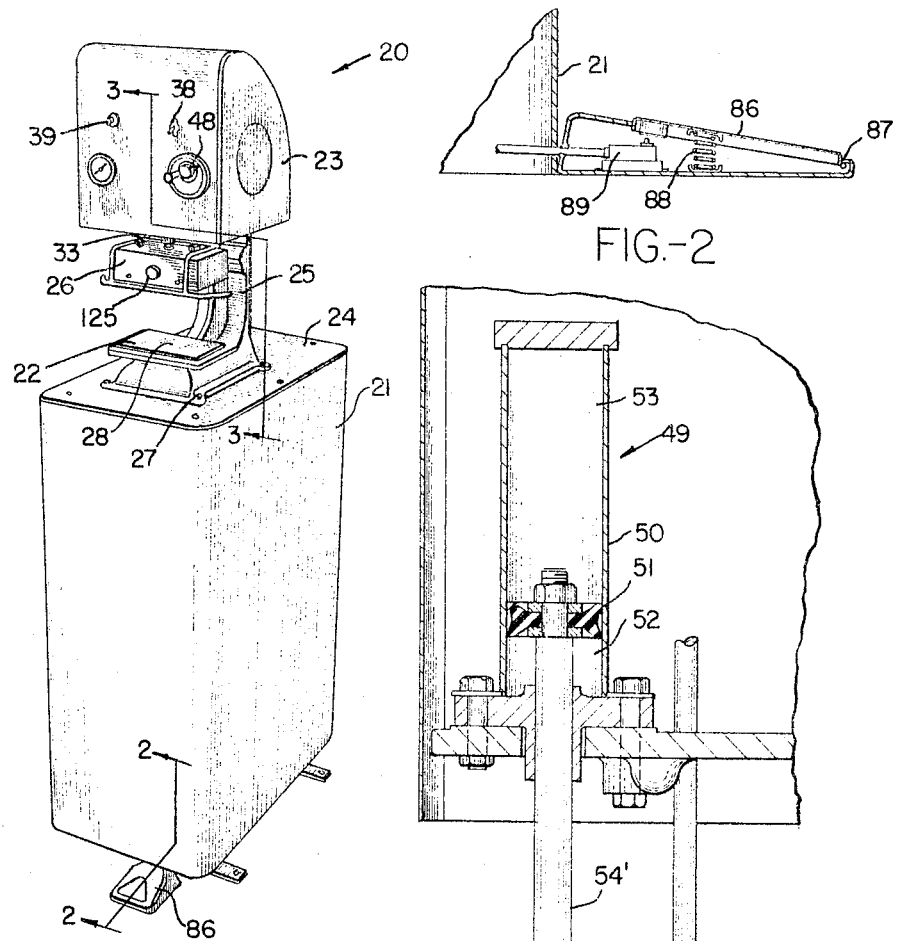
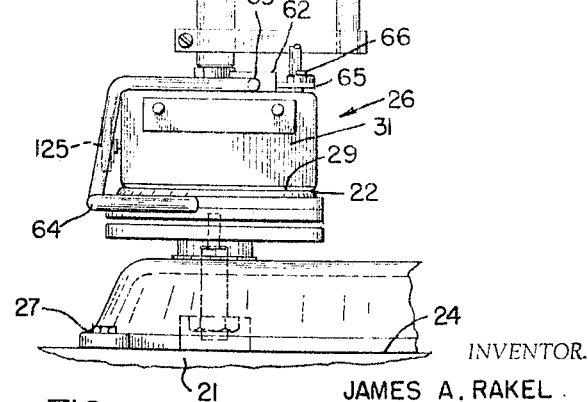
INVENTOR.
JAMES A. RAKEL
BY
Kinney and Schenk
HIS ATTORNEYS

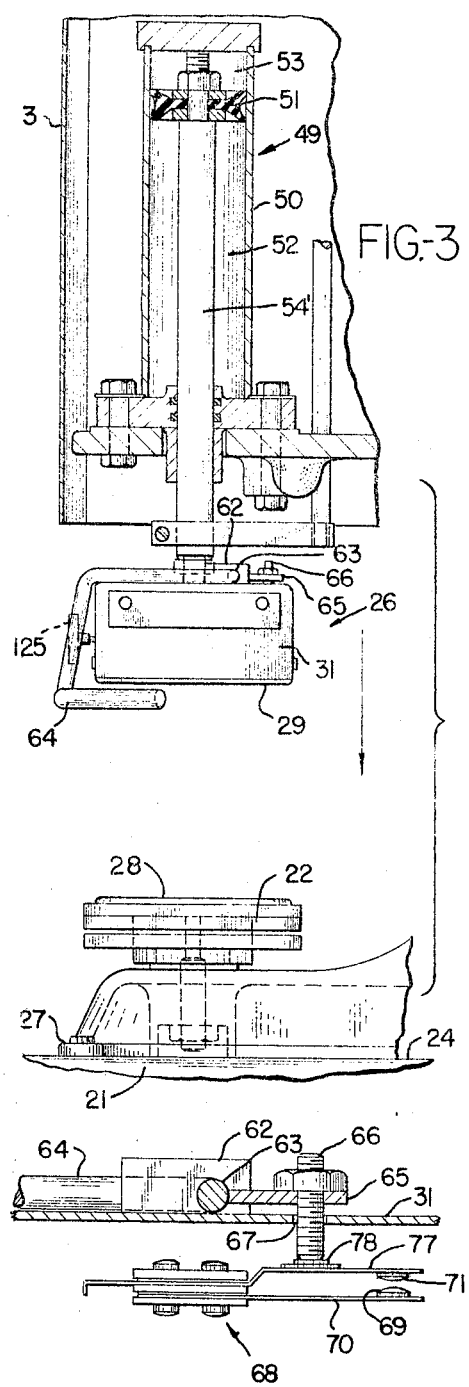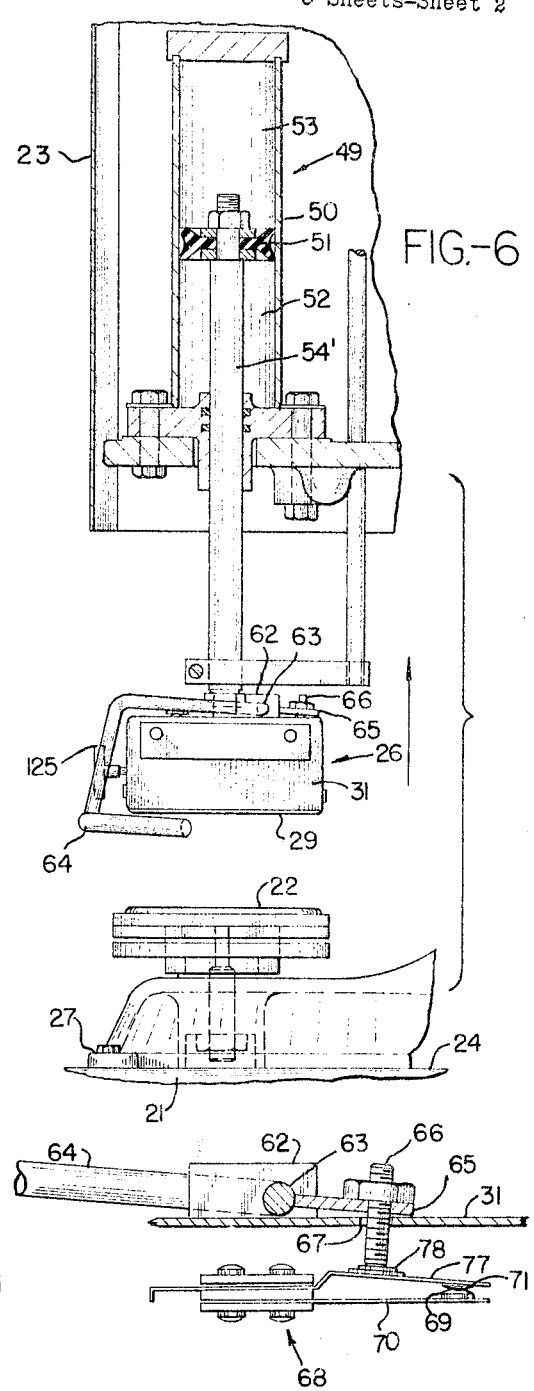

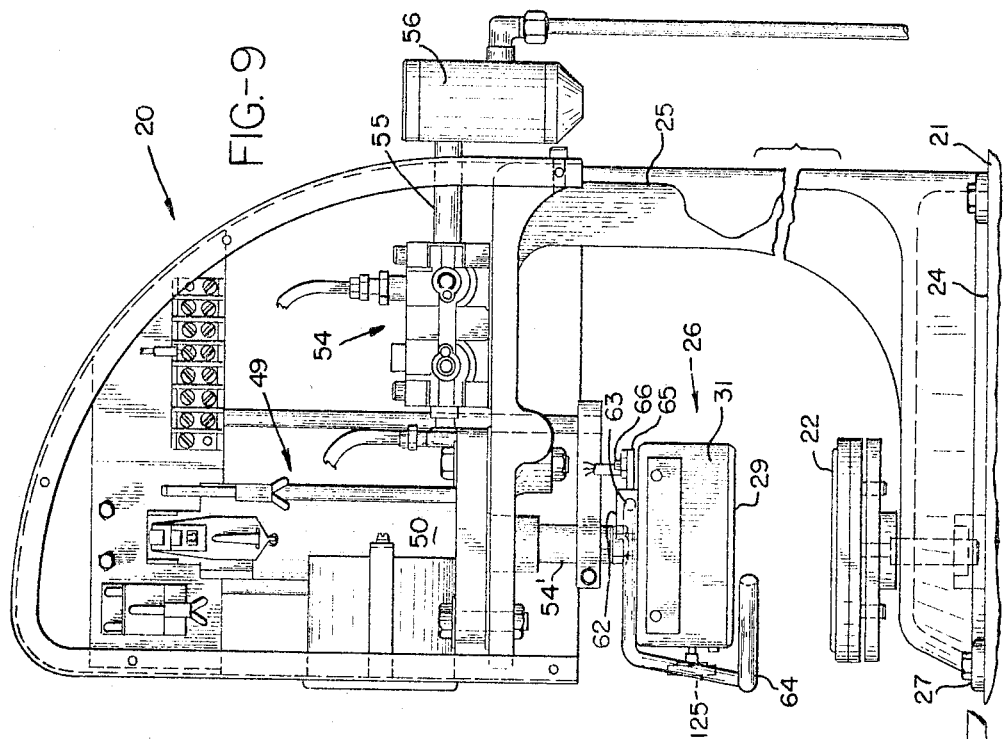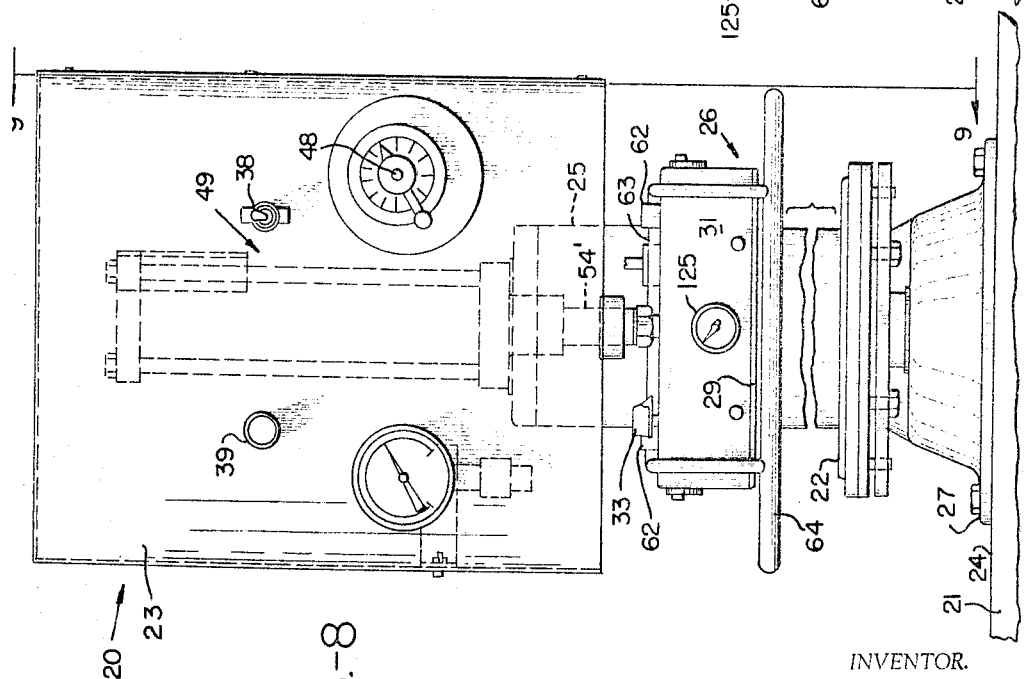

Sept. 13, 1966  J. A. RAKEL  3,272,114
HEAT SEALING APPARATUS
Filed May 15, 1964  5 Sheets-Sheet 4

INVENTOR.
JAMES A. RAKEL
BY
*Kinney and Schenk*
HIS ATTORNEYS

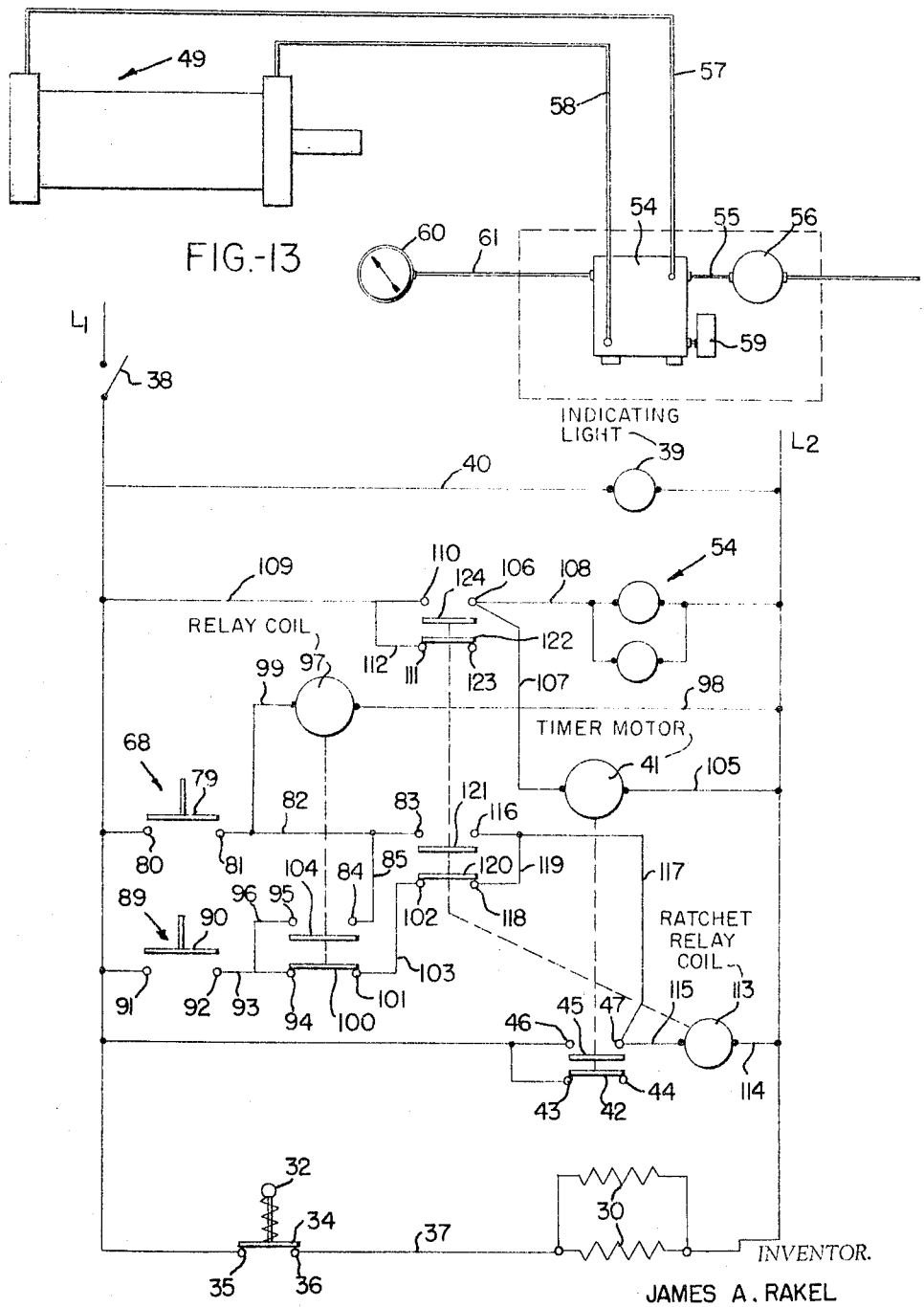

United States Patent Office 3,272,114
Patented Sept. 13, 1966

3,272,114
HEAT SEALING APPARATUS
James A. Rakel, Cincinnati, Ohio, assignor to The National Marking Machine Co., Cincinnati, Ohio, a corporation of Ohio
Filed May 15, 1964, Ser. No. 367,783
1 Claim. (Cl. 100—53)

This invention relates to an improved heat sealing apparatus or the like.

It is well known that various heat sealing apparatus have been provided wherein a device to be heat sealed or the like is placed on top of one head of the apparatus and a movable head is moved toward the stationary head to heat seal the material disposed therebetween.

However, according to the teachings of this invention, the movable head usually moves through an arcuate path whereby a non-uniform heat distribution is provided by the movable head as well as an uneven distributed pressure thereof.

However, according to the tecahings of this invention, an improved heat sealing apparatus or the like is provided wherein the movable head moves in a direction substantially perpendicular to the surface means of the stationary head to not only give uniform heat distribution between the heads of the apparatus, but also to provide an evenly distributed pressure therebetween to more accurately control the heat sealing operation.

Further, the apparatus of this invention readily permits the movable head to remain in its heat sealing position for a predetermined period of time before the same is raised out of its heat sealing position.

However, improved safety features are provided for the apparatus of this invention whereby if a person's hand or the like is disposed between the heads of the apparatus and the movable head is moved toward the stationary head, the safety features of this invention will automatically cause the movable head to move to its normal out-of-the-way position and remain in such normal postion until the apparatus is operated in a predetermined proper sequence thereof in a manner hereinafter described.

While the apparatus of this invention has many uses thereof, one use of this invention is to attach tape, patches and other heat sealable marking and mending heat materials to clothes and the like.

In addition, this invention can be utilized to remove tape from garments and the like that are to be reissued, to heat set or make permanent ink marks which have been applied on heat sealable tape or directly to fabrics, to remove from garments name emblems that have been sewn on with nylon bobbin thread and the like, to apply heat set transfers and the like, etc.

Accordingly, it is an object of this invention to provide an improved heat sealing apparatus having one or more of the novel features as set forth above or hereinafter shown or described.

Other objects, uses and advantages of this invention are apparent from a reading of this description which proceeds with reference to the accompanying drawings forming a part thereof and wherein:

FIGURE 1 is a front perspective view of the improved apparatus of this invention.

FIGURE 2 is a fragmentary, enlarged, cross-sectional view taken substantially on line 2—2 of FIGURE 1.

FIGURE 3 is a fragmentary, enlarged, cross-sectional view taken substantially on line 3—3 of FIGURE 1.

FIGURE 4 is an enlarged, fragmentary, cross-sectional view of the safety switch feature of this invention.

FIGURE 5 is a view similar to FIGURE 3 and illustrates the movable head in its heat sealing position.

FIGURE 6 is a view similar to FIGURE 3 and illustrates the actuation of the safety bar means of the apparatus of this invention.

FIGURE 7 is a view similar to FIGURE 4 and illustrates the safety switch means in its closed position.

FIGURE 8 is an enlarged, fragmentary, front view of the apparatus illustrated in FIGURE 1.

FIGURE 9 is an enlarged, fragmentary, cross-sectional view taken on line 9—9 of FIGURE 8.

FIGURE 13 is a schematic view illustrating the fluid system of this invention.

FIGURE 14 is a schematic view illustrating the electrical system of the apparatus of this invention.

Figure 10:
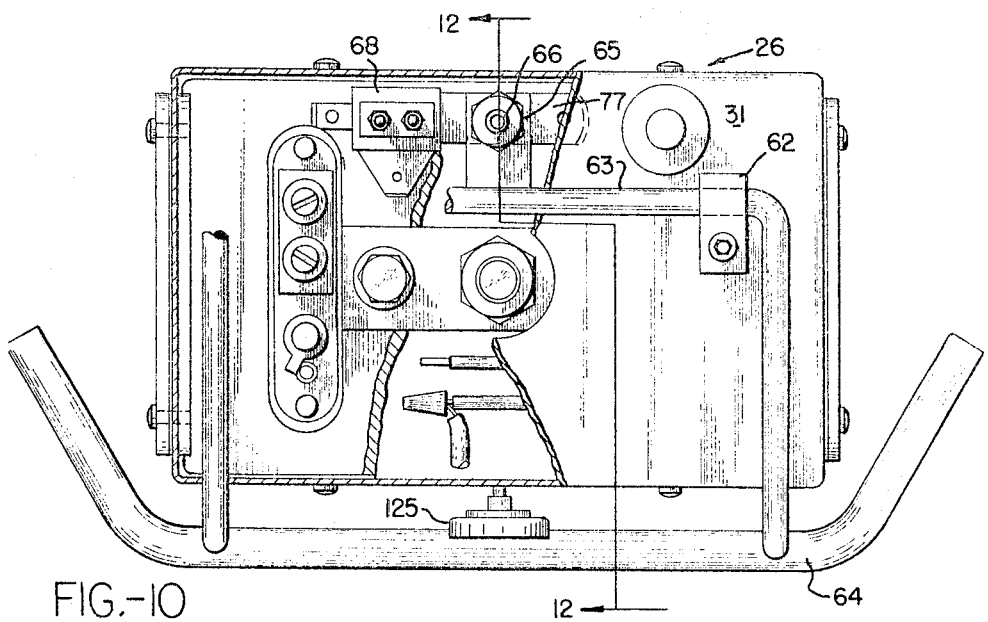
FIGURE 10 is a top view of the movable head of this invention with parts thereof broken away.

While the various features of this invention are hereinafter described and illustrated as being particularly adaptable for providing heat sealing means or the like, it is to be understood that the various features of this invention can be utilized singly or in any combination thereof to provide other types of devices as desired.

Therefore, this invention is not limited to only the embodiment illustrated in the drawings, because the drawings are merely utilized to illustrate one of the wide variety of uses of this invention.

Referring now to FIGURE 1, the improved heat sealing apparatus of this invention is generally indicated by the reference numeral 20 and comprises a base structure 21 formed in any suitable configuration to support a stationary head 22 of the apparatus 20 above the desired supporting floor structure or the like, the base 21 being utilized to position the stationary head 22 at the proper level for the operator or the like of the apparatus 20.

A housing 23 is mounted above the top surface 24 of the base 21 by means of a support means 25 and carries a movable heat sealing head 26 cooperable with the stationary head 22 in a manner hereinafter described, the support 25 being directly fastened to the top surface 24 of the base 21 by fastening means 27 and also holding the stationary head 22.

As illustrated in FIGURES 1 and 3, the stationary head 22 has an upper flat surface 28 which cooperates with a lower flat surface 29 on the movable head 26 to heat seal material disposed therebetween when the head 26 is moved downwardly to the position illustrated in FIGURE 5 in a manner hereinafter described. Of course, the apparatus 20 can be utilized for purposes other than heat sealing purposes, as desired.

The movable head 26 has one or more electrical heaters 30, FIGURE 14, mounted in the housing 31 thereof to effectively heat the heat sealing surface 29 thereof, the temperature effect of the heaters 30 being controlled by a suitable thermostat 32, FIGURE 14, selectively set by a temperature indicating knob 33 carried by the movable head 26. The thermostat 32 is adapted to close a switch blade 34, FIGURE 14, across a pair of contacts 35 and 36 when the temperature of the surface 29 of the heating head 26 is below a temperature selected by the knob 33 and to open the switch blade 34 from the contacts 35 and 36 when the temperature of the surface 29 of the head 26 is above the temperature selected by the knob 33 for a purpose hereinafter described, the heaters 30 being placed in parallel across electrical power leads $L^1$ and $L^2$ by a lead 37 having the switch 34 disposed therein.

In order to turn on and off the apparatus 20 of this invention, a manual on-off switch 38, FIGURE 14, is placed in the line L¹ and projects outwardly from the housing 23 in the manner illustrated in FIGURE 1.

An indicating light 39 is carried by the housing 23 and is disposed across the leads L¹ and L² by a lead 40 whereby when the switch 38 is turned to its on position, the indicating light 39 indicates to the user of the apparatus 20 that the same has been turned on and is receiving electrical power.

A suitable timer motor 41, FIGURE 14, is carried by the apparatus 20 and is adapted to move a switch blade 42 into contact with contacts 43 and 44 and move a switch blade 45 out of contact with contacts 46 and 47 when the timer motor 41 has been set for a predetermined length of time, the timer motor subsequently moving the switch blade 42 out of contact with the contacts 43 and 44 and moving the switch blade 45 into contact with the contacts 46 and 47 after the predetermined length of time has run out in a manner hereinafter described. The timer motor 41 has the predetermined time interval thereof set by a control knob 48 carried on the face of the housing 23 for a purpose hereinafter described.

A fluid operated piston and cylinder arrangement 49 is disposed in the housing 23 and comprises a cylinder defining member 50 having a piston 51 disposed therein and dividing the same into two chambers 52 and 53, the piston 51 carrying a piston rod 54' interconnected to the head 26.

In this manner, when pressure fluid is directed to the chamber 53 of the piston and cylinder arrangement 49 and the chamber 52 is vented, the piston 51 moves from the position illustrated in FIGURE 3 to the position illustrated in FIGURE 5 to move the head 26 against the head 22 with the desired pressure, the head 26 moving in a straight path perpendicular to the surface means 28 of the head 22 to provide uniform heat and pressure distribution therebetween.

Conversely, when pressure fluid is directed to the chamber 52 and the chamber 53 of the piston and cylinder arrangement 49 is interconnected to a vent, the head 26 is moved from the position illustrated in FIGURE 5 to the position illustrated in FIGURE 3.

A conventional solenoid operated valve 54 is mounted in the housing 23 and has the inlet thereof interconnected to a source of pressure fluid by a conduit means 55 having a suitable filter 56 disposed therein.

As illustrated in FIGURE 13, a conduit 57 interconnects the valve 54 with the chamber 53 of the piston and cylinder arrangement 49 while a conduit 58 interconnects the valve 54 with the chamber 52 thereof.

The valve 54 is provided with an exhaust outlet 59 for a purpose hereinafter described and has the inlet side thereof interconnected to a pressure gage 60 by a conduit 61, the pressure gage 60 being mounted on the housing 23 so that the operator will know what the fluid pressure of the apparatus 20 is at all times.

The solenoid operated valve 54 is so constructed and arranged that when the same is not energized, the same directs pressure fluid through the conduit 58 to the chamber 52 of the piston and cylinder arrangement 49 while venting the chamber 53 to the exhaust 59 whereby the movable head 26 is normally held in its raised position by fluid pressure as illustrated in FIGURE 3. However, when the solenoids of the valve 54 are energized, the same interconnects the source of pressure fluid to the chamber 53 of the piston and cylinder arrangement 49 by means of the conduit 57 while venting the chamber 52 to the exhaust 59 by means of the conduit 58 whereby the head 26 is moved downwardly against the head 22 in the manner illustrated in FIGURE 5 until the solenoids of the valve 54 are deenergized.

Figure 11:
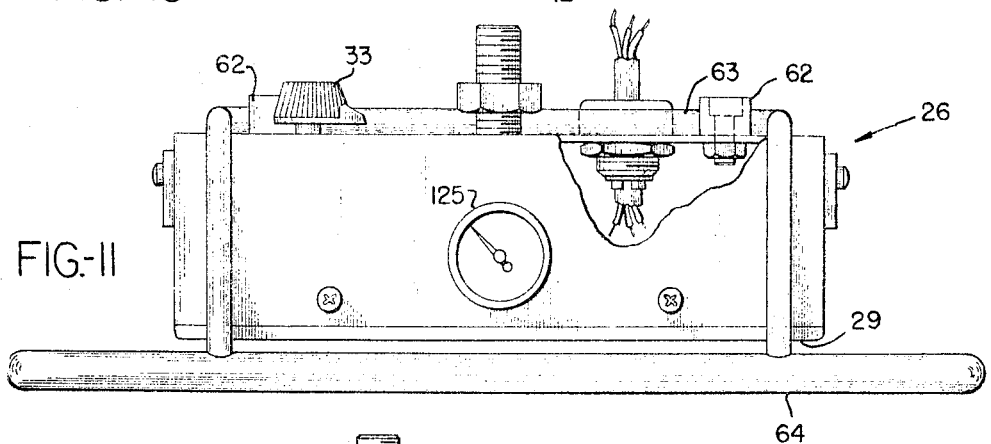
FIGURE 11 is a front view of the movable head illustrated in FIGURE 10 with parts thereof broken away.
Figure 12:
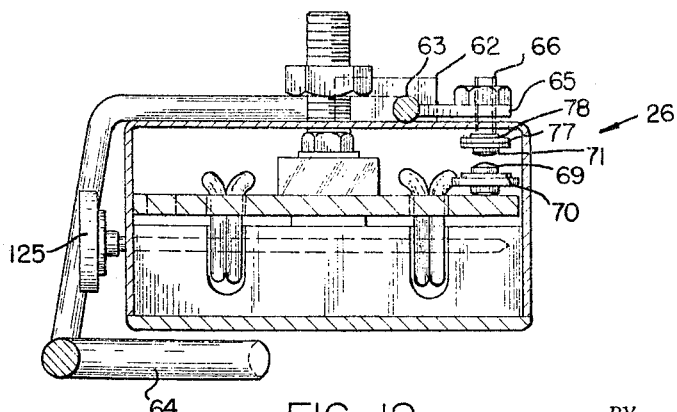
FIGURE 12 is a cross-sectional view taken substantially on line 12—12 of FIGURE 10.

As illustrated in FIGURES 10–12, the movable head 26 has a plurality of mounting members 62 pivotally carrying an arm 63 of a safety bar means 64 which surrounds the head 26 and is disposed below the heating surface 29 thereof in the manner illustrated in FIGURES 11 and 12.

The pivotally mounted arm 63 of the safety bar 64 has a rearwardly extending flange 65 attached thereto and interconnected to an adjustable plunger 66 projecting through a suitable aperture 67, FIGURE 4, in the housing 31 of the head 26.

A switch structure 68 is disposed in the housing 31 of the head 26 and has one contact 69 carried by a blade 70 and another contact 71 carried by a blade 77 normally biased by the natural resiliency of the blade 77 out of contact with the contact 69. However, the blade 77 carries an electrically insulated button 78 engageable by the adjustable plunger 66 of the safety bar 64.

Thus, as long as the safety bar 64 is in its non-pivoted position as illustrated in FIGURES 11 and 12, it can be seen that the contacts 69 and 71 of the switch structure 68 are out of contact with each other.

However, should the bar 64 be pivoted upwardly in the manner illustrated in FIGURES 6 and 7 for any reason, such as by an operator's hand or arm being disposed between the heads 26 and 22 when the head 26 is being lowered, the pivoted safety bar 64 causes the contact 71 of the switching mechanism 68 to move into electrical contact with the contact 69 thereof to terminate the flow of electrical current through the solenoid operated valve 54 in a manner hereinafter described so that the valve 54 will automatically move the head 26 to its upper position in a manner hereinafter described.

Therefore, it can be seen that the safety switch mechanism 68 of this invention is adapted to be disposed within the housing 31 of the head 26 so that the switching mechanism 68 does not require a special casing therefor which would tend to be adversely affected by the heat of the heaters 30 in the movable head 26.

The switching mechanism 68 is illustrated schematically in FIGURE 14 as a switch blade 79 normally disposed in an open position which when closed by pivoting of the safety bars 64 will contact a pair of contacts 80 and 81 in a lead 82 interconnected to a contact 83 and to another contact 84 by a branch lead 85 for a purpose hereinafter described.

The normal operation of the apparatus 20 is controlled by a foot pedal 86 illustrated in FIGURES 1 and 2, the foot pedal 86 being pivoted at 87 and normally urged to its up position by a compression spring 88. However, when the foot pedal 86 is pressed downwardly by the operator's foot or the like in opposition to the force of the compression spring 88, the same is adapted to close a switching mechanism 89 to cause a heat sealing operation or the like of the apparatus 20 in the manner hereinafter described.

The switching mechanism 89 is schematically illustrated in FIGURE 14 as a switch blade 90 adapted to be closed against a pair of contacts 91 and 92 disposed in a lead 93 when the pedal 86 is depressed, the lead 93 being interconnected to a contact 94 and to another contact 95 by a branch lead 96.

A relay coil 97 has one side thereof interconnected to the power lead L² by a lead 98 while the other side thereof is interconnected to the lead 82 by a lead 99, the relay coil 97 when in a deenergized condition thereof has a switch blade 100 thereof normally bridging the contact 94 with another contact 101 interconnected to a contact 102 by a lead 103. However, when the relay coil 97 is energized in a manner hereinafter described, the switch contact blade 100 is moved out of contact with the contacts 94 and 101 and a switch blade 104 is moved to bridge the contacts 95 and 84 for a purpose hereinafter described.

The electrical timer motor 41 has one side thereof interconnected to the power source lead L² by a lead 105 while the other side of the timer motor 41 is interconnected to a contact 106 by a lead 107.

The lead 106 is interconnected to the power source by a lead 108, the solenoid valve 54 being disposed in the lead 108 for a purpose hereinafter described.

A lead 109 connects the power source lead L¹ to a contact 110 and is also interconnected to a contact 111 by a branch lead 112.

A ratchet relay coil 113 has one side thereof interconnected to the power source lead L² by a lead 114 while the other side thereof is interconnected to the contact 47 by a lead 115. The ratchet relay coil 113 is of the type which is commercially available for example from the Guardian Electric Manufacturing Company, of Chicago, Illinois, and identified as Guardian Impulse Ratchet Relay AC–670–2C–115A.

The contact 47 is in turn interconnected to a contact 116 by a lead 117, the lead 117 also being interconnected to a contact 118 by a branch lead 119.

When the relay coil 113 is energized in a manner hereinafter described the same is adapted to move a switch blade 120 out of normal contact with the contacts 102 and 118 and cause a switch blade 121 to bridge the contacts 83 and 116 for a purpose hereinafter described.

Simultaneously with the movements of the switch blades 120 and 121, the energized relay coil 113 is adapted to move a switch blade 122 out of contact with the contact 111 and another contact 123 while moving a switch blade 124 into contact with the contacts 110 and 106 for a purpose hereinafter described.

The relay coil 113 and its associated parts are so constructed and arranged that when the same is energized, it moves the switch blades 120, 121, 122 and 124 upwardly in FIGURE 14 and the same remain in their upper positions even though the coil 113 is subsequently deenergized.

Thereafter, when the coil 113 is again energized, the same moves the switch blades 120, 121, 122 and 124 downwardly whereby the same remain in the full line position illustrated in FIGURE 14 even though the coil 113 is again deenergized. Thus, it can be seen that the coil 113 and its associated parts form a ratchet type relay which is conventional in the art.

The operation of the apparatus 20 of this invention will now be described.

When the operator desires to utilize the apparatus 20, the operator sets the timer knob 48 to the desired time for having the movable head 26 disposed against the stationary head 22 for a heat sealing operation or the like. Thereafter, the operator sets the thermostat knob 33 to the desired temperature to which the heating head 26 is to be heated.

Subsequently, the operator turns on the switch 38 to place the heaters 30 across the power leads L¹ and L².

The operator can watch a thermometer 125 on the front of the head 26 to determine when the head 26 has been brought up to the desired temperature as selected by the knob 33. When this happens, the operator then places the material to be heat sealed or the like onto the top surface 28 of the stationary head 22.

With the material in position, the operator then depresses the foot pedal 86 so that the switch blade 90 in FIGURE 14 bridges the contacts 91 and 92 to permit current to flow to the relay coil 113 and cause the switch blades 120, 121, 122 and 124 thereof to move upwardly and bridge the contacts 83, 116 and 110, 106.

Thus, it can be seen that the flow of current to the relay coil 113 is now terminated by movement of the switch blade 120 away from the contacts 102 and 118. At the same time, however, the switch blade 124 bridges the contacts 110 and 106 and allows current to flow to the solenoid operated valve 54 which directs the fluid pressure to the chamber 53 of the piston and cylinder arrangement 49 to cause the head 26 to be moved downwardly toward the head 22 and remain in engagement with the material disposed on the head 22 for a predetermined length of time as will now be described.

Since the switch blade 124 bridges the contacts 110 and 106, it can be seen that the timer motor 41 is now placed across the leads L¹ and L² and begins to run the predetermined length of time as set by the control knob 48.

When the timer motor eventually runs out, the same moves the switch blade 42 out of contact with the contacts 43 and 44 while moving the switch blade 45 into contact with the contacts 46 and 47 to again place the relay coil 113 across the power leads L¹ and L² and cause the switch blades 120, 121, 122 and 124 to move downwardly to the full line positions as illustrated in FIGURE 14.

When the switch blade 124 is moved out of contact with the contacts 110 and 106, it can be seen that the current to the solenoid operated valve 54 is terminated whereby pressure fluid is again directed to the chamber 52 of the piston and cylinder arrangement 49 to cause the movable head 26 to move upwardly and remain in the position illustrated in FIGURE 3.

Should the operator begin to operate the apparatus 20 in the above manner and while the movable head 26 is moving downwardly towards the stationary head 22 in the manner previously described with an arm or hand being disposed between the heads 22 and 26, it can be seen that the safety bar 64 will be moved to the position illustrated in FIGURES 6 and 7 whereby the switch blade 79 in FIGURE 14 will be moved against the contacts 80 and 81 and thereby cause the relay coil 113 to be again placed across the leads L¹ and L² because the switch blade 121 is bridging the contacts 83 and 116. When this happens, the reenergization of the relay 113 causes the switch blades 120, 121, 122 and 124 to move downwardly to the position illustrated in FIGURE 14 whereby the solenoid coil 54 has the flow of current thereof terminated and will cause the head 26 to automatically move to its upper position as illustrated in FIGURE 3.

When the safety switch 68 is actuated by the tripping of the safety bar 64 and the operator still is depressing the pedal 86 to close the switch blade 90 across the contacts 91 and 92, it will be seen that the relay coil 97 has been energized by the closed switch blade 79 whereby the switch blade 100 has been moved away from the contacts 94 and 101 while the switch blade 104 has been moved against the contacts 95 and 84 whereby the coil 97 is being held in energization by switch blade 79 across contacts 80 and 81 or by switch blade 90 across contacts 91 and 92 whereby the coil 113 cannot be reenergized when the safety switch 68 is closed and the foot pedal 86 is being operated.

Thus, if the safety bar 64 is actuated at any time, even for a second, the head 26 will rise to the position illustrated in FIGURE 3 and remain in this position until the foot switch 89 is returned to its open position and then reactuated.

Thus, once the safety switch 68 has been actuated, the apparatus 20 cannot be reoperated until both the safety switch 68 and foot operated switch 89 have been returned to their open positions.

After a normal operation of the apparatus 20 and the operator still maintains the pedal 86 in its depressed condition after the timer motor 41 has run out and supplied current to the relay coil 113 to cause the switch blades 120, 121, 122 and 124 to return to the position illustrated in FIGURE 14, current will be supplied to the relay 113 not only through the closed contacts 46 and 47 but also by the closed contacts 102 and 118 whereby current from two sources will be supplied simultaneously to the relay coil 113 and, thus, will not cause the relay coil 113 to again move the contacts 120, 121, 122 and 124 upwardly in FIGURE 14.

Thus, it can be seen that the operator must release the pedal 86 which in turn resets the timer motor 41, before the apparatus 20 can be operated for a second operation thereof.

Should the safety switch 68 be actuated before the foot pedal 86 is actuated, it can be seen that the relay coil 97 is energized to move the switch blade 100 out of contact with the contacts 94 and 101 and move the switch blade 104 into contact with the contacts 95 and 84. Thus, when the foot switch 89 is subsequently actuated, the current flows to the open contact 83 whereby the coil 113 cannot be placed across power leads $L^1$ and $L^2$. If the foot pedal should remain in its down position and the safety switch 68 again be opened, it can be seen that the relay coil 97 is still placed across the leads $L^1$ and $L^2$ by means of the switch blade 104 whereby the pedal 86 must be released before the apparatus 20 can be operated in a normal manner.

Thus, it can be seen that the control means for the apparatus 20 of this invention are so constructed and arranged that in order to cause the apparatus 20 to perform an operating cycle thereof, everything must be set in a predetermined pattern for the apparatus 20 or the same will not operate whereby the apparatus 20 of this invention is substantially foolproof and accident free.

Accordingly, it can be seen that not only does this invention provide an improved heat sealing apparatus and the like to be utilized for any desired purpose, but also this invention provides an improved method of providing such an apparatus or the like.

While the form of the invention now preferred has been disclosed as required by the statutes, other forms may be used, all coming within the scope of the claim which follows.

What is claimed is:

A heat sealing apparatus or the like comprising support means, a fixed head carried by said support means and having a surface means, a piston and cylinder arrangement carried by said support means, a movable head operatively interconnected to said piston and having a surface means cooperable with said surface means of said fixed head to heat seal material therebetween, a solenoid operated valve for directing fluid pressure to said cylinder to move said movable head away from said fixed head when no electrical current is supplied to said solenoid and for directing fluid pressure to said cylinder to move said movable head toward said fixed head when electrical current is supplied to said solenoid, lever means for causing electrical current to flow to said solenoid when said lever means is moved to one position thereof, timer means for terminating the supply of electrical current to said solenoid when a predetermined time has lapsed, and a safety bar means for terminating the supply of electrical current to said solenoid when said safety bar means is moved to one position thereof regardless of the condition of said lever and said timer, and said safety bar means preventing said electrical current from flowing to said solenoid until said safety bar means is moved to another position thereof and said lever has been moved to another position thereof.

References Cited by the Examiner

UNITED STATES PATENTS

| | | | |
|---|---|---|---|
| 584,574 | 10/1892 | Venker | 100—93 |
| 2,415,766 | 2/1947 | Shapiro | 100—93 X |
| 2,581,977 | 1/1952 | Spalding et al. | 100—93 |
| 2,617,224 | 11/1952 | Kingsland et al. | 100—93 X |
| 2,934,129 | 4/1960 | Wilson et al. | 100—93 |
| 3,047,051 | 7/1962 | Matveeff | 100—93 X |

LOUIS O. MAASSEL, *Primary Examiner.*

WALTER A. SCHEEL, *Examiner.*